United States Patent
Levy et al.

(10) Patent No.: US 7,020,303 B2
(45) Date of Patent: Mar. 28, 2006

(54) FEATURE-BASED WATERMARKS AND WATERMARK DETECTION STRATEGIES

(75) Inventors: Kenneth L. Levy, Stevenson, WA (US); Stephen K. Decker, Lake Oswego, OR (US)

(73) Assignee: Digimarc Corporation, Beaverton, OR (US)

( * ) Notice: Subject to any disclaimer, the term of this patent is extended or adjusted under 35 U.S.C. 154(b) by 727 days.

(21) Appl. No.: 09/810,079

(22) Filed: Mar. 16, 2001

(65) Prior Publication Data

US 2001/0036292 A1   Nov. 1, 2001

Related U.S. Application Data

(60) Provisional application No. 60/190,481, filed on Mar. 18, 2000.

(51) Int. Cl.
*G06K 9/00* (2006.01)

(52) U.S. Cl. .................. 382/100; 382/236; 375/241

(58) Field of Classification Search ............. 382/100, 382/115, 119, 140, 182, 197, 232–243, 251–253, 382/255, 260, 274, 275, 112, 191, 276, 305; 375/130, 241, 240, 242; 386/103; 347/260
See application file for complete search history.

(56) References Cited

U.S. PATENT DOCUMENTS

| | | | |
|---|---|---|---|
| 3,809,806 A * | 5/1974 | Walker et al. ............... 347/260 |
| 4,979,210 A | 12/1990 | Nagata | |
| 5,495,254 A | 2/1996 | Uemura et al. | |
| 5,509,191 A | 4/1996 | Best | |
| 5,543,937 A * | 8/1996 | Hamai et al. ............... 386/103 |
| 5,654,204 A | 8/1997 | Anderson | |
| 5,664,018 A | 9/1997 | Leighton | |
| 5,748,763 A | 5/1998 | Rhoads | |
| 5,790,703 A | 8/1998 | Wang | |
| 5,809,160 A * | 9/1998 | Powell et al. ............... 382/100 |
| 5,832,119 A | 11/1998 | Rhoads | |
| 5,835,639 A | 11/1998 | Honsinger et al. | |
| 5,841,978 A | 11/1998 | Rhoads | |
| 5,859,920 A | 1/1999 | Daly et al. | |
| 5,862,260 A | 1/1999 | Rhoads | |
| 5,878,080 A * | 3/1999 | Ten Kate ................... 375/241 |
| 5,901,178 A * | 5/1999 | Lee et al. ................... 375/240 |
| 5,905,800 A | 5/1999 | Moskowitz et al. | |
| 5,930,377 A * | 7/1999 | Powell et al. ............... 382/100 |
| 5,940,135 A | 8/1999 | Petrovic et al. | |
| 5,949,055 A | 9/1999 | Fleet et al. | |
| 5,956,716 A | 9/1999 | Kenner et al. | |
| 6,031,914 A | 2/2000 | Tewfik et al. | |
| 6,154,484 A * | 11/2000 | Lee et al. ................... 375/130 |
| 6,185,683 B1 | 2/2001 | Ginter et al. | |
| 6,201,879 B1 | 3/2001 | Bender et al. | |

(Continued)

FOREIGN PATENT DOCUMENTS

WO    WO 9743736    11/1997

OTHER PUBLICATIONS

U.S. Appl. No. 09/522,678, Mar. 10, 2000, Levy.

(Continued)

*Primary Examiner*—Daniel Miriam
*Assistant Examiner*—Seyed Azarian
(74) *Attorney, Agent, or Firm*—Digimarc Corporation

(57) ABSTRACT

Processes and apparatus for improving the state of the art for watermarking and data protection. The disclosure includes feature-based watermarks, auto- and cross-correlation techniques for determining scaling and rotation, transitions in time based watermarking, autocorrelation watermarks for images, and dynamic content scrambling of static files.

12 Claims, 2 Drawing Sheets

U.S. PATENT DOCUMENTS

| | | | |
|---|---|---|---|
| 6,233,684 | B1 | 5/2001 | Stefik et al. |
| 6,272,634 | B1 | 8/2001 | Tewfik et al. |
| 6,311,214 | B1 | 10/2001 | Rhoads |
| 6,415,977 | B1 | 7/2002 | Rumsey |
| 6,425,081 | B1 | 7/2002 | Iwamura |
| 6,427,012 | B1 | 7/2002 | Petrovic et al. |
| 6,427,020 | B1 | 7/2002 | Rhoads |
| 6,456,726 | B1 | 9/2002 | Yu et al. |
| 6,570,996 | B1 | 5/2003 | Linnartz |
| 6,614,914 | B1 | 9/2003 | Rhoads et al. |
| 6,633,654 | B1 | 10/2003 | Hannigan et al. |
| 6,735,324 | B1 | 5/2004 | McKinley et al. |
| 6,744,906 | B1 | 6/2004 | Rhoads et al. |
| 6,785,815 | B1 | 8/2004 | Serret-Avila |
| 6,807,285 | B1 | 10/2004 | Iwamura |
| 2001/0052076 | A1 | 12/2001 | Kadono |
| 2002/0097873 | A1 | 7/2002 | Petrovic |
| 2002/0114491 | A1 | 8/2002 | Sharma et al. |
| 2002/0159615 | A1 | 10/2002 | Rhoads et al. |

OTHER PUBLICATIONS

U.S. Appl. No. 60/190,481, Mar. 18, 2000, Levy.

P. Bas, et al., "Robust Watermarking Based on the Warping of Pre-Defined Triangular Patterns," in Security and Watermarking of Multimedia Contents II, Ping Wah Wong, Edward J. Delp, Editors, Proceedings of SPIE vol. 3971, pp. 99-109 (2000).

J. Dittman, et al., "A new approach for transformation in variant image and video watermarking in the spatial domain: SSP—self spanning patterns," in Security and Watermarking of Multimedia Contents II, Ping Wah Wong, Edward J. Delp, Editors, Proceedings of SPIE vol. 3971, pp. 176-185 (2000).

Jun. 10, 2005 Amendment and attachments (including Declaration of Clayton L. Davidson) filed in U.S. Appl. No. 10/112,647. U.S. Appl. No. 10/112,647 was published as US 2002-0159615 A1.

Matsui, et al. "Video-Steganography: How to Secretly Embed a Signature in a Picture," Proc. Technological Strategies for Protecting Intellectual Property in the Networked Multimedia Environment, vol. 1, issue 1, Jan., 1994, pp. 187-205.

Tanaka et al. "New Integrated Coding Scemes for Computer-Aided Facsimile," Proc. IEEE Int'l Conf. On Sys. Integration, pp. 275-281.

EP 01920399.1 search report dated Jun. 14, 2005, 5 pages.

* cited by examiner

Fig 4a                    Fig 4b

FEATURE-BASED WATERMARKS AND WATERMARK DETECTION STRATEGIES

RELATED APPLICATION DATA

This patent application claims the benefit of U.S. Provisional Patent Application No. 60/190,481, entitled Embedded Data and Data Scrambling Improvements, filed Mar. 18, 2000 by Ken Levy, which is incorporated by reference.

FIELD OF THE INVENTION

This invention relates to the field of embedding auxiliary data into a signal and protecting the signal via data scrambling or encryption.

BACKGROUND AND SUMMARY

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's co-pending application Ser. No. 09/503,881 and U.S. Pat. No. 5,862,260, which are hereby incorporated by reference.

The invention provides a feature-based watermark embedding and decoding method and related systems and applications. One aspect of the invention is a feature based watermark embedding method for hiding auxiliary data in a media signal. The method identifies some number of features in the media signal, such as signal peaks or peaks of the signal's derivative. It then embeds a watermark around the features by modulating sample values in a group of samples around each feature according to a watermark signal layer. This technique applies to still images, video and audio signals.

Further features will become apparent with reference to the following detailed description and accompanying drawings.

BRIEF DESCRIPTION OF THE DRAWINGS

FIG. 1a: Diagram for retrieving a feature-based watermark to ease searching a large image for a small watermarked area.

FIG. 4a: This figure shows the grid used to embed an autocorrelation-based watermark.

FIG. 4b: This figure demonstrates how to skip embedding data in some blocks to find the orientation of an autocorrelation-based watermarked image. X's represent watermarked blocks; thus, blocks without Xs are not watermarked.

DETAILED DESCRIPTION

Feature-Based Watermark

When using noise reduction techniques, such as Weiner filtering or spectral subtraction, you can obtain the embedded watermark as noise. This noise represents the sum of all the watermark layers. This noise can be re-scaled and embedded in other images such that they impersonate the original image.

However, when embedding another noise layer that consists of local arrays around the largest N (maybe 5) features, such as peak of the derivative, of the image, this attack can be stopped. The idea is similar to U.S. Pat. Nos. 5,809,160 and 5,930,377 invented by Powell and Nitzberg and assigned to Digimarc, included herein by reference. When using peaks, they should have a certain average slope around them. Alternatively, you could use the peak of the derivative of the image since an edge correlates to this peak and edges are good places to hide data.

To this end, when all the noise layers are moved from one image to the other as one grouped noise, as done with this copy attack, the new features most likely will not align with the old features. As expected, the more features used, the less likely that they align between the old and new image. Thus, the decoder knows the image is an imposter. In addition, features such as peaks or peaks of the derivative are robust to most transformation. Finally, since these features occur within the image, a global database is not required to determine where the image specific watermarks occur.

There may be a problem with backwards compatibility, meaning how does the detector know if the image has been tampered or the image is an old image made before the peak noise layer was added. There are three suggestions described below. The first suggestion is that a different group of global PN sequences could be used in this new version than with earlier versions. The second suggestion is to add a layer of noise defining the version. The third is to use different spacing or position in the grid used to determine scaling and rotation of the embedded data.

In addition, when trying to find a watermarked area of a large image, feature-based watermarking is advantageous. As well known, searching the whole image for the small watermark is slow.

Figure 1A:
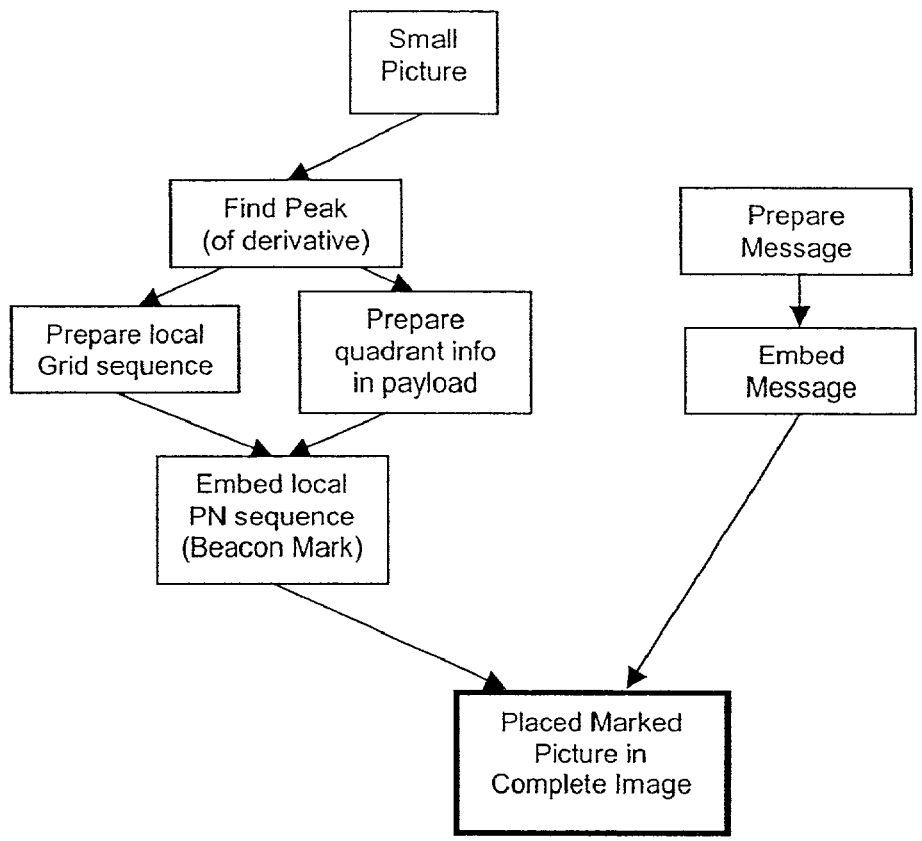
FIG. 1a: Diagram for embedding a feature-based watermark to ease searching a large image for a small watermarked area.
Figure 1B:
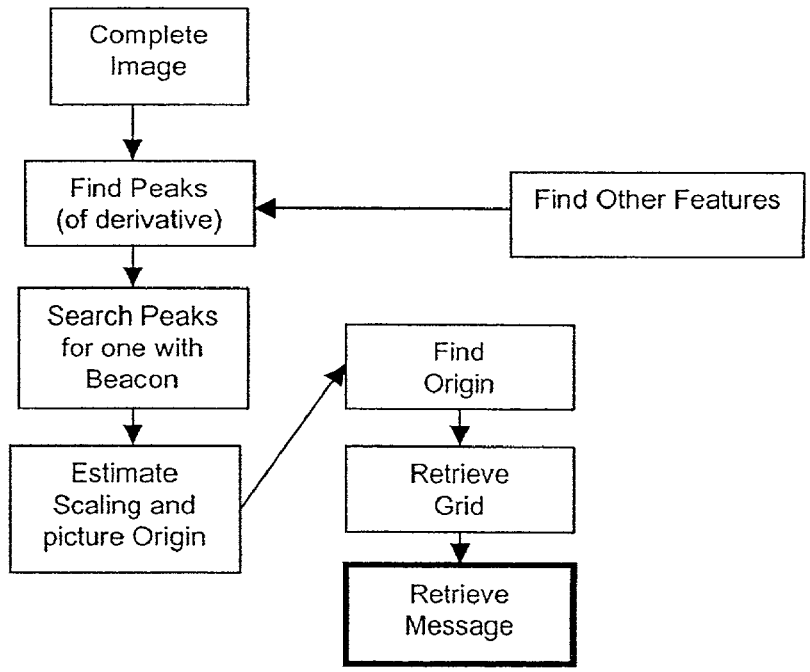

As shown in FIGS. 1a and 1b, the process is to use a feature of the picture, such as the peak of the derivate, to embed a space-limited data, such as a local PN sequence, that provides information about the location of the picture's corner and the scaling. In addition, the whole block structure of the watermark, such as P by Q pixel areas for embedding (e.g., P and Q are preferably the same and multiples of two), could be based around this feature; thus, the feature-based watermark and embedded data carrying the message do not overlap. Using the peak of the derivative is ideal since the eye does not perceive noise near edges and it is robust to scaling and scanning. It is also efficient to find in the decoding process since only a few occurrences of the features should exist in the rest of the image. Finally, it is advantageous if the feature is not on the edge of the embedded area. If the feature is near an edge some embedded data, i.e. PN sequence, will be lost.

This embedded local-feature PN sequence will intrinsically inform the decoder that the feature is part of the picture by its existence. This local-feature PN sequence should also include a grid layer so that once it is found the scaling coefficient can be determined. Instead of a grid layer, the watermark decoder could employ the autocorrelation and cross-correlation scaling methods for compensating for scaling and rotation discussed in this document. This local-feature PN sequence should also include a few layers to provide where the lower-left (or other corner) of the picture is located. For example, two layers could inform the decoder which quadrant the feature was located. With the scaling and quadrant information, finding the global PN sequence, which carries the message, will be easier and faster.

Scaling

This method is illustrated through the following two embodiments. In the first embodiment, auto-correlation of an image and self-similar noise layer is used to determine the image's scaling and rotation.

Figures 2, 3:
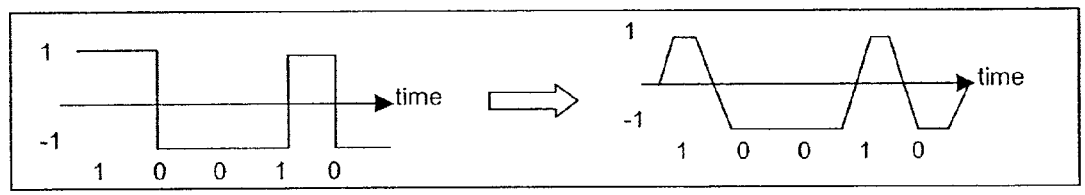
FIG. 2: This figures shows a pseudo-random noise array that can be used to determine the scaling and rotation of an image via autocorrelation.
FIG. 3: This figure demonstrates the art of slowing the transition between embedding auxiliary 0's and 1's.

FIG. 2 shows the self-similar noise array layer that can be embedded within an image, or sequentially within audio, to determine the time scaling and rotation, for 2D images only. The PN variable is, for example, a 10×10 array of noise, where each PN sequence is identical. The 0 variable is, for example, a 10×10 array of zeros. There is a tradeoff between larger PN and 0 array sizes, which are less likely to be visible, and computations for autocorrelation. For example, when using 10×10 arrays, the autocorrelation only needs to include 20 multiply and add instructions per pixel to catch 0.5 to 2X changes.

The second embodiment includes estimating the image transformation by cross-correlating an original PN noise layer with an image which previously had the PN noise layer added and has been modified. Assuming the image has only been linearly transformed, such as by rotation or scaling, the PN noise layer is white, and the PN noise layer is orthogonal to the image, the result of the cross-correlation is the impulse function of the transformation. This impulse function can be used to improve recovery of the watermark. Finally, concepts from spectral estimation can be applied to increase the accuracy of the estimation since the assumptions are usually only partially true.

Transitions

In audio applications, the transition between embedding a 0 and 1 bit of auxiliary information occur by immediately changing the phase of the PN sequence, i.e. switch from multiplying by −1 and 1 and visa-versa. For example, after representing a 0 auxiliary bit by subtracting 100 ms of shaped noise from the signal, the 1 auxiliary bit is represented by adding the shaped noise to the next signal sample and so-on for 100 ms more. This is true in video applications. However, the eyes and ears are very susceptible to changes.

Thus, as shown in FIG. 3, the transition between 0 and 1 bit of auxiliary information should have a transition period where the phase of the noise sequence is slowly changed. Although this will lower the embedded bit rate, it should decrease the perception of the watermark. The transition period length could be from 1 to 1 several hundreds of a milliseconds.

Autocorrelation Watermarks

In general, a problem with reading watermarks via digital cameras, such as CCD or CMOS based cameras, is that the cameras integrate over space to get a color value. This integration is used since each camera receiving-element, such as a CCD, takes up space and a RGB or CMYK color grid is used. This integration does not degrade the picture quality since real-world pictures have data points that are correlated to its neighbor. However, with white noise-based watermarks, where the value changes every pixel, the camera not only removes the noise but also produces incorrect data since every pixel is independent in white noise. A current solution is to use noise where the value changes in blocks of pixels.

An alternative solution uses an autocorrelation based watermark, defined as taking a copy of the image, lowering its level, and placing it slightly offset from the original image. Either the offset value or copy level can be used to transfer 0's and 1's. For example, up and left shifts represent 1's, whereas down and right shifts represent 0's. The watermark is retrieved by calculating the autocorrelation function and finding the offset value of the peak, which is provided by the embedded low-level and shifted copy of the image.

This type of watermark survives integration since, as with real-world data, the neighboring will be related to each other and survive the camera's integration. This watermark will also be invisible since it intrinsically places the data where it can be hidden. In other words, an offset copy of the image is already prepared to be hidden in the image.

The prior-art shows this type of mark being used in audio, and bits are embedded sequentially, such as with U.S. Pat. No. 5,940,135 Aug. 17, 1999 assigned to Aris Technologies, Inc, and included herein by reference. However, this process can only work with images in video. Thus, for single images, if the whole image is used, only one bit per image could easily be embedded and retrieved.

As shown in FIG. 4a, a process that uses several blocks per image can be used to increase the embedded data rate. The block size is a balance between the number of embedded bits versus amount of noise embedded to retrieve one bit. In addition, the smaller the block size, more information is lost in edge patterns. Finally, the shift used in embedding the low level copy of the image should be minimal so as not to degrade quality, such as blurring the edges. It appears desirable to have the shift larger than a single cameral pixel element, i.e. one CCD grid.

Finally, when splitting the image into blocks, the orientation of the blocks relative to the retrieved image is required. Traditionally, a noise grid covering each block is used. However, skipping the embedding process in some blocks can be used to locate the center or similar section of the image. In FIG. 4b, the X blocks contain watermarks, and the blocks without X's do not contain watermarks. As one can see, the non-watermarked blocks point to the center of the image as well as determine is rotation since they are asymmetrical.

Dynamic Media Scrambling

The problem with encrypting or scrambling content files is that they will be stored, such as on a hard-drive or optical disk, for a long time, possibly more than 10 years. This gives a pirate a long time to break the protection. As compared to other encrypted transactions, such as a bank withdrawal, if the pirate cannot break the code during the transaction, it is too late since the next transaction uses new keys. The current solution is to reject broken keys. However, this means that a legitimate user could find his/her content does not play and needs to be re-encrypted, or his/her device needs a firmware upgrade when he/she has done nothing. This will confuse and upset the customer.

The dynamic media scrambling process is to re-encrypt or re-scramble the content using a new technique or key each time the content is rendered (assuming the device is re-writeable), or using some other interval, possibly regular or not. This technique is invisible to the consumer. In addition, when keys are found to be broken, the removal of that key from the system will happen over time without any inconvenience to the legitimate consumer.

When content is rendered on the user's machine, the encryption routine decrypts the content using the current key. Then a new key is created, and the encryption routine encrypts the content for storage on the user's machine. To generate a new key, the encryption routine changes part or all of the previous key. In particular, part of the key may be based on something unique to the machine or software running on the machine, such as a processor ID, or date of the trash can or recycle bin in the operating system. The remainder of the key changes with each rendering according to a random or pseudorandom function. When the new key is created, it is stored in a secure, encrypted and tamper resistant file on the user's machine. This key is used the next time the content is rendered.

The key not be changed each time the content is rendered. Alternatively, it may be changed each Nth time that the content is rendered, where N is some pre-determined integer. Alternatively, the key may be changed based on some external event trigger, such as the receipt of a new key from a local or remote key management system, or the receipt of a key update flag from a key management system or registry database that instructs the encryption routine on the user's device to update the key the next time the content is rendered.

This process of key updating enables encryption keys to be updated over time, and eventually move old or broken keys out of the system.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A feature based embedding method for hiding auxiliary data in a media signal comprising:
   identifying N features in the media signal, where N comprises an integer greater than one; and
   embedding a signal around the N features by modulating sample values in a group of samples around each feature according to a signal layer, wherein the features comprise peaks of a mathematical derivative of the media signal.

2. The method of claim 1 wherein the media signal comprises an image.

3. The method of claim 1 wherein the signal comprises a noise layer.

4. A feature based watermark embedding method for hiding auxiliary data in a media signal comprising:
   identifying N features in the media signal, where N comprises an integer greater than one; and
   embedding a watermark around the N features by modulating sample values in a group of samples around each feature according to a watermark signal layer,
   wherein different types of watermark signals are embedded into the media signal: a first type embedded around at least some of the N features in the media signal, and a second type embedded in at least some parts of the media signal.

5. The method of claim 4 wherein the media signal comprises an image.

6. The method of claim 5 wherein the features comprises peaks of the image.

7. The method of claim 6 wherein the features comprise peaks of the derivative of the image.

8. The method of claim 4 wherein the second type carries a message payload.

9. A feature based watermark embedding method for hiding auxiliary data in a media signal comprising:
   identifying N features in the media signal, where N comprises an integer greater than one; and
   embedding a watermark around the N features by modulating sample values in a group of samples around each feature according to a watermark signal layer, wherein the watermark signal has correlation properties that enable a watermark decoder to compensate for scaling distortion by computing auto or cross correlation of the watermarked signal and deriving scaling from positioning of peaks in a resulting signal.

10. A feature based watermark embedding method for hiding auxiliary data in a media signal comprising:
    identifying N features in the media signal, where N comprises an integer greater than one; and
    embedding a watermark around the N features by modulating sample values in a group of samples around each feature according to a watermark signal layer, wherein the watermark comprises a PN sequence of symbol values of either 1 or −1, the symbols are mapped to samples of the media signal, and transitions in phase between adjacent groups of samples corresponding to different symbols are made to change slowly.

11. A method of decoding a feature based watermark that hides auxiliary data in a media signal comprising:
    identifying N features in the media signal, where N comprises an integer greater than one; and
    decoding a watermark around the N features by correlating sample values in a group of samples around each feature with a watermark signal layer;

using one of the N features as a reference for decoding auxiliary data for one or more of the other features, wherein multiple different watermark layers are decoded including watermark layers around the features and elsewhere.

12. The method of claim 11 wherein the watermark layers employ PN sequence carrier signals detected using cross correlation or autocorrelation functions on the watermarked signal.

* * * * *